US012361330B2

(12) United States Patent
Xiao et al.

(10) Patent No.: US 12,361,330 B2
(45) Date of Patent: Jul. 15, 2025

(54) FACTORIZATION MACHINE WITH L-2 NORM REDUCTION FOR MACHINE LEARNED MODELS

(71) Applicant: Microsoft Technology Licensing, LLC, Redmond, WA (US)

(72) Inventors: Qiang Xiao, Sunnyvale, CA (US); Haichao Wei, Santa Clara, CA (US); Jun Shi, Fremont, CA (US); Huiji Gao, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 931 days.

(21) Appl. No.: 17/513,317

(22) Filed: Oct. 28, 2021

(65) Prior Publication Data

US 2023/0135401 A1 May 4, 2023

(51) Int. Cl.
  *G06N 20/20* (2019.01)
  *G06F 18/21* (2023.01)
  *G06F 18/214* (2023.01)
  *G06N 20/10* (2019.01)
  *G06Q 10/1053* (2023.01)

(52) U.S. Cl.
  CPC ........... *G06N 20/10* (2019.01); *G06F 18/214* (2023.01); *G06F 18/217* (2023.01); *G06N 20/20* (2019.01); *G06Q 10/1053* (2013.01)

(58) Field of Classification Search
  CPC ...... G06N 20/10; G06N 20/20; G06F 18/217; G06F 18/214; G06Q 10/1053
  See application file for complete search history.

(56) References Cited

U.S. PATENT DOCUMENTS

| 2016/0379132 | A1* | 12/2016 | Jin .................. H04L 67/535 706/12 |
| 2018/0082191 | A1* | 3/2018 | Pearmain ............... G06N 20/00 |
| 2018/0336527 | A1* | 11/2018 | Kenthapadi ............. H04L 67/75 |
| 2020/0167914 | A1* | 5/2020 | Stamatoyannopoulos .................. G16B 40/30 |
| 2021/0334697 | A1* | 10/2021 | Hanley ..................... G06N 3/08 |
| 2021/0383308 | A1* | 12/2021 | Hanna .................... G06N 20/00 |
| 2022/0051076 | A1* | 2/2022 | Bingham ............... G06N 3/084 |

* cited by examiner

*Primary Examiner* — Beau D Spratt
(74) *Attorney, Agent, or Firm* — Cantor Colburn LLP; Renee D. Brown (57) ABSTRACT

In an example, a particular type of deep learning model is used in the global model of the GDMix model: a Factorization Machine. A Factorization Machine combines a Support Vector Machine (SVM) and Matrix Factorizations. It has the advantage of modeling data with huge sparsity well, while maintaining a linear time complexity. A modification may be further made to the Factorization Machine by introducing $L^2$ norm reduction. This acts to divide calculations made by the Factorization Machine into a portion that can be precomputed and a portion that cannot be precomputed. The portion that can be precomputed is then precomputed in an offline manner. As such, when the model is operated in an online manner, the Factorization Machine only needs to compute the portion that cannot be precomputed, reducing the number of operations that need to performed at runtime and greatly improving processing speed over prior machine learned models.

16 Claims, 6 Drawing Sheets

FACTORIZATION MACHINE WITH L-2 NORM REDUCTION FOR MACHINE LEARNED MODELS

TECHNICAL FIELD

The present disclosure generally relates to technical problems encountered in machine learning on computer networks. More specifically, the present disclosure relates to the use of a factorization machine with L-2 norm reduction for machine learned models.

BACKGROUND

The rise of the Internet has occasioned an increase in the use of online services to perform searches for job listings that have been posted on or linked to by the online services, as well as other types of online information and presentations of information, such as presentation of recommended items in "feeds" on a social networking service.

The searches may either be performed explicitly by, for example, a user typing in a search query looking for particular job listings, or implicitly, by presenting the user with job listings the system determines the user will be interested in. The latter may be presented in an area of a graphical user interface termed "Jobs You May Be Interested In." In the case of feeds, the implicit search is performed by identifying social networking content that the system determines may interest the user and presenting it in the feed.

In either the implicit or explicit case, results are presented based on scoring of potential results using a machine-learned model. In the case of explicit searches, the explicit search query is a large factor in the scoring of the results (which would evaluate match features such as how often terms that appear in the query appear in the results). In the case of implicit searches, match features are not used as no explicit search query is provided, but other features may be evaluated to score the results. For job listings, these may include features not just related to the job listings themselves, but also features related to the user to which the job may be recommended, as well as other features.

Historically, machine learned models to rank job search results, whether via explicit or implicit query, have utilized a global ranking algorithm. A global ranking model is trained using all features in a training set. For example, if the training set includes features about job listings and features about users who may be interested in the job listings, the global ranking algorithm is trained using both the features about the job listings and the features about the users. While this has the advantage of including a large amount of training data since essentially all the available training data is used to train the model, thus making the model fairly reliable for most cases, it has the disadvantage in that it largely ignores personalization. Namely, such models essentially assume that users who have similar user features to each other will act in similar ways when presented with the same job listings, and that job listings which have similar job features to each other will be somewhat similar in how users react to them. That is not always the case, however. A user who is a patent attorney and has many user features in common with other patent attorneys may, for whatever reason, not be interested in patent attorney job listings and instead be interested in chef job listings, despite not having anything in his or her user profile indicative of an interest in being a chef and despite all of the users with similar user profiles to the user being interested in patent attorney job listings based on past click history. In such a case, a global ranking model would wind up returning job results that the user is not interested in, even though on the larger scale the model is fairly reliable in that most users receive relevant job results.

An example of such a model is a generalized linear model (GLM). A GLM is a generalization of linear regression that allows for response variables that have error distribution models other than a normal distribution. The GLM generalizes linear regression by allowing the linear model to be related to the response variable via a link function and by allowing the magnitude of the variance of each measurement to be a function of its predicted value.

GLMs may utilize the following prediction formula:

$$g(\mathbb{E}[y_{ij}]) = x_{ij}'w$$

where this formula predicts the response of user i to item j (such as a job), and is a feature vector, w is a coefficient vector, $\mathbb{E}[y_{ij}] = x_{ij}'w$ is an expectation of response, and g( ) is a link function.

BRIEF DESCRIPTION OF THE DRAWINGS

Some embodiments of the technology are illustrated, by way of example and not limitation, in the figures of the accompanying drawings.

DETAILED DESCRIPTION

Overview

One approach for better capturing a user's personal preference for items and an item's specific attraction for users in prediction/recommender systems would be to introduce identification (ID)-level regression coefficients in addition to the global regression coefficients in a GLM setting. Such a solution is known as a generalized linear mixed model (GLMix).

GLMix works by combining a global model (or a global portion of a larger model) and one or more random effect models (or random effect portions of a larger model). The random effect models/portions are able to add the personalization aspects to the larger global model/portion. The global model and the random effect models are linear.

Linear models, however, may not be truly reliable in certain scenarios. More particularly, standard GLMix models are unable to effectively model the relationships between source features, such as query features or user features, and target features, such as job features. As such, in an example embodiment, deep learning may be introduced to the global model of the GLMix model. Since the larger model is no longer completely linear (only the random effect portion(s) is/are), this may be termed a Global Deep Mixed (GDMix) model.

In an example embodiment, a particular type of deep learning model is used in the global model of the GDMix model: a Factorization Machine. A Factorization Machine combines a Support Vector Machine (SVM) and Matrix Factorizations. It has the advantage of modeling data with huge sparsity well, while maintaining a linear time complexity.

In a further example embodiment, a modification is further made to the Factorization Machine by introducing $L^2$ (also known as L-2) norm reduction. This acts to divide calculations made by the Factorization Machine into a portion that can be precomputed and a portion that cannot be precomputed. The portion that can be precomputed is then precomputed in an offline manner. As such, when the model is operated in an online manner, the Factorization Machine only needs to compute the portion that cannot be precomputed, reducing the number of operations that need to performed at runtime and greatly improving processing speed over prior machine learned models.

DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

GLMix models are used to improve certain types of results presented to users of computer systems, such as job listing results. In the context of job searching, one key aspect is to show the best job listings to a user based on his or her query, according to some measure. In one example embodiment, this measure may be quantified as the likelihood of user m applying for job j if served when he or she enters the query q, measured by the binary response $y_{mjs}$. $s_j$ denotes the feature vector of job j, which includes features extracted from the job posting, such as the job title, summary, location, desired skills, and experience needed. $x_{mjq}$ represents the overall feature vector for the (m, j, q) triple, which can include user, job, query, and associated context features, and any combination thereof.

Specifically, a GLMix model is trained using sample job posting results and sample user data, including information that particular users applied to particular sample job postings (or otherwise expressed interest in the results). The GLMix model is then trained on the space of job features in addition to a global model. This allows finer signals in the training data to be captured, thus allowing, for example, for better differentiation on how the presence of a particular job skill, as opposed to another skill, should generate job posting results. Further, the GLMix model is trained on the space of user features in addition to the global model and the job-features aspect. This allows for better differentiation on how the presence of particular job attributes should generate job posting results.

In other words, in a GLMix model, a global portion (also called the fixed effect portion) is trained on an entire set of training data, including data that contains any values for any of the features in the training set, whether they are query features, user features, or job features, while one or more per-something portions (also called random effect portions) are trained on different subsets of training data, thus creating multiple personalized models for each feature of a particular type. Thus, in the case where the global features include query features, user features, and job features, a number of different per-user features may be trained, each one including only the training data that pertains to a single user of all the users in the training data and each one also ignoring all of (or not being trained on any of) the user features of that corresponding user). Likewise, a number of different per-job user features may be trained, with each one including only the training data that pertains to a single job of all the job listings in the training data, and also ignoring all of the (or not being trained on any of) the job features of that corresponding job.

The training of the GLMix model causes weights to be learned for each of the possible features input to the model. In other words, the training process involves the machine learning algorithm trying different values for weights, with each feature having its own weight, and calculating a loss function for each combination of values for the weights until the loss function is minimized. At that point, the weights value for each of the features has been learned.

When the GLMix model is then used to determine whether to recommend a particular job to a particular user, a score calculated by the per-user portion corresponding to that particular user (based on the job features of the particular job) and a score calculated by the per-job portion corresponding to that particular job (based on the user features of the particular user) are combined with a score calculated by the global portion (based on the user features of the particular user and the job features of the particular job) to arrive at a score that can be used to determine whether or not to recommend the particular job to the particular user (based on a comparison of the score to scores of other job listings, for example, and/or comparison to a threshold). This calculation includes, for each feature value, multiplying the feature value by the corresponding learned weight Predictions/recommendations can be made even more accurate by using three models instead of a single GLMix model. Specifically, rather than having a single GLMix model with different coefficients for users and items, three separate models are used and then combined. Each of these models has different granularities and dimensions. A global model may model the similarity between user attributes (e.g., from the member profile or activity history) and item attributes. A per-user model may model user attributes and activity history. A per-item model may model item attributes and activity history. Such a model may be termed a Generalized Additive Mixed Effect (GAME) model.

In the context of a job search result ranking or recommendation, this results in the following components:

a global model that captures the general behavior of how members apply for job listings a member-specific model with parameters (to be learned from data) specific to the given member to capture member's personal behavior that deviates from the general behavior, and a job-specific model with parameters (to be learned from data) specific to the given job to capture the job's unique behavior that deviates from the general behavior.

The following is a description of how a GAME model enables such a level of personalization. Let $y_{mjt}$ denote the binary response of whether user m would apply for job j in context t, where the context usually includes the time and location where the job is shown. $q_m$ is used to denote the feature vector of user m, which includes the features extracted from the user's public profile (e.g., the member's title, job function, education history, industry, etc.). $s_j$ is used to denote the feature vector of job j, which includes features extracted from the job post (e.g., the job title, desired skills and experiences, etc.). Let $x_{mjt}$ represent the overall feature vector for the (m, j, t) triple, which can include $q_m$ and $s_j$ for feature-level main effects, the outer product between $q_m$ and $s_j$ for interactions among member and job features, and features of the context, the context being circumstances around which the interaction occurred, such as the portion of the user interface in which the interactions occurred. It may be assumed that $x_{mjt}$ does not contain member IDs or item IDs as features, because IDs will be treated differently from regular features. The GAME model for predicting the probability of user m applying for job j using logistic regression is:

$$g(E[y_{mjt}]) = x'_{mjt}b + s'_j\alpha_m + q'_m\beta_j$$

where $$g(E[y_{mjt}]) = \log\frac{E[y_{mjt}]}{1 - E[y_{mjt}]}$$

is the link function; b is the global coefficient vector (also called fixed effect coefficients); and $\alpha_m$ and $\beta_j$ are the coefficient vectors specific to user m and job j, respectively. $\alpha_m$ and $\beta_j$ are called random effect coefficients, which capture user m's personal preference on different item features and job j's attraction for different member features. For a user m with many responses to different items in the past, this is able to accurately estimate her personal coefficient vector $\alpha_m$ and provide personalized predictions. On the other hand, if user m does not have much past response data, the posterior mean of $\alpha_m$ will be close to zero, and the model for user m will fall back to the global fixed effect component $x'_{mjt}b$. The same behavior applies to the per-job coefficient vector $\beta_j$.

However, for large data sets with a large number of ID-level coefficients, fitting a GLMix model or GAME model can be computationally challenging, especially as the solution scales.

In an example embodiment, the scalability bottleneck is overcome by applying parallelized block coordinate descent under a Bulk Synchronous Parallel (BSP) paradigm.

Traditionally, the fitting algorithms for random effect models required random effect coefficients F to be integrated out either analytically or numerically, which becomes infeasible when facing industry-scale large data sets. Similarly, both deterministic and Markov chain Monte Carlo (MCMC) sampling that operate on Γ as a whole become cumbersome.

In an example embodiment, a parallel block-wise coordinate descent-based iterative conditional mode process may be used, where the posterior mode of the random effect coefficients Fr, for each random effect r, is treated as a block-wise coordinate to be optimized in the space of unknown parameters. Given the scores, the optimization problems for updating the fixed effects b and the random effects Fr are as follows:

$$b = \underset{b}{\operatorname{argmax}}\left\{\log p(b) + \sum_{n \in \Omega}\log p(y_n \mid s_n - x'_n b^{old} + x'_n b)\right\}$$

$$\gamma_{rl} = \underset{\gamma_{rl}}{\operatorname{argmax}}\left\{\log p(\gamma_{rl}) + \sum_{n|i(r,n)=l}\log p(y_n \mid s_n - z'_{rn}\gamma_{rl}^{old} + z'_{rn}\gamma_{rl})\right\}$$

Incremental updates for $s = \{s_n\}_{n \in \Omega}$ may be performed for computational efficiency. More specifically, when the fixed effects b get updated, $s_n^{new} = s_n^{old} - x'_n b^{old} + x'_n b^{new}$ may be applied for updating s, and when the random effects Γ get updated, $s_n^{new} = s_n^{old} - z'_{rn}\gamma_{r,i(r,n)}^{old} + z'_{rn}\gamma_{r,i(r,n)}^{new}$ may be used.

At iteration k of the model algorithm: $(E[y_{mjt}]) = x'_{mjt}b + s'_j\alpha_m + q'_m\beta_j$, let $s^k$ denote the current value of $s = \{s_n\}_n \in \Omega$. Let P denote the dimension of fixed effect feature space, i.e., $x_n \in \mathbb{R}^P$, and $P_r$ denote the dimension of the feature space for random effect r, i.e., $z_{rn} \in \mathbb{R}^{P_r}$. C denotes the overall dimension of the feature space, for example $$C = P + \sum_{r \in R} P_r N_r,$$

where $N_r$ denotes the number of random effects of type r (e.g., number of users). For the set of sample responses $\gamma(\Omega) = \{\gamma_n\}_{n \in \Omega}$, $|\Omega|$, is used to denote the size of Ω (i.e., the total number of training samples). Additionally, $|\mathcal{R}|$ is the number of types of random effects, and M is the number of computing nodes in the cluster. These numbers can be used to compute the network input/output cost of the disclosed techniques, with this network input/output cost typically being one of the major technical challenges in scaling up in a distributed computing environment.

The process involves preparing the training data for fixed effect model training with scores, updating the fixed effect coefficients (b), and updating the scores s. Then the training data for random effects model training is prepared with scores and the random effect coefficients and scores are updated. The random effects model training and updating can then continue for each additional random effects model.

The general formulation of GLMix is defined as $$\operatorname{logit}(p_n) = G(x_n, b) + \sum_{r \in R} f_{r,i(r,n)}(z_{rn})$$

Here, G(xn;b) is an unknown function of known form that depends on unknown parameters b. For instance, G could be a composition of linear model, Gradient Boosting Decision Tree (GBDT) or Deep Neural Networks (DNNs). On the other hand, frl are specific functions that depend on the covariate vector. For example if R={member, item}, fmember,i, fitem,j denotes the functions for the i-th member and j-th item respectively.

In GLMix, one assumes $$f_{member,i}(z_{item,n}) = z_{item,n}^T \beta_i$$

$$f_{item,j}(z_{member,n}) = z_{member,n}^T \alpha_j$$

where $\beta_i$ and $\alpha_j$ denote unknown parameter vectors associated with user i and item j, respectively. These user- and item-specific local linear terms provide necessary residual user- and item-specific personalization that may not be captured through the global term G. To perform regularization, L2 penalties are imposed on the α's and β's. This is what makes the model a personalization engine.

In a GDMix model, the linear global model/portion of a GLMix model is swapped out for a deep learning model. One example of such a deep learning model is a deep natural language processing model such DeText. However in an example embodiment, a Factorization Machine is used as the deep learning model.

A Factorization machine combines the advantages of SVM with factorization models. Like SVMs, Factorization machines are a general predictor working with any real valued feature vector, but in contrast to SVMs, Factorization Machines model all interactions between variables using factorized parameters. Thus, they are able to estimate interactions even in use cases having huge sparsity, where SVMs fail.

More particularly, the Factorization Machine models all nested variable interactions, similarly to a polynomial kernel in SVM, but uses a factorized parameterization instead of a dense parameterization like in SVMs.

The model equation for a factorization machine of degree d=2 is defined as:

$$\hat{y}(x) := w_0 + \sum_{i=1}^{n} w_i x_i = \sum_{i=1}^{n} \sum_{j=i+1}^{n} \langle v_i, v_j \rangle x_i x_j$$

where the model parameters that have to be estimated are:

$$w_0 \in \mathbb{R}, w \in \mathbb{R}^n, V \in \mathbb{R}^{n \times k}$$

And $\langle , \rangle$ is the dot product of two vectors of size k:

$$\langle v_i, v_j \rangle := \sum_{f=1}^{k} v_{i,f} \cdot v_{j,f}$$

A row $v_i$ within V describes the i-th variable with k factors. $k \in \mathbb{N}_0^+$ is a hyperparameter that defines the dimensionality of the factorization.

A 2-way Factorization Machine (degree d=2) captures all single and pairwise interactions between variables:

$w_0$ is the global bias.

$w_i$ models the strength of the i-th variable.

$\hat{w}_{i,j} := \langle v_i, v_j \rangle$ models the interaction between the i-th and j-th variable. Instead of using an own model parameter $w_{i,j} \in \mathbb{R}$ for each interaction, the FM models the interaction by factorizing it. We will see later on that this is the key point which allows high quality parameter estimates of higher-order interactions (d≥2) under sparsity.

Assuming that user-related features occupy input fields from 1 to m, and document-related features occupy input fields from m+1 to n, in an example embodiment, user-related operations U may be defined as $$U_1 = w_0 + \sum_{i=1}^{m} w_i x_i$$

$$U_{2,f} = \sum_{i=1}^{m} v_{i,f} x_i$$

$$U_3 = \frac{1}{2} \sum_{f=1}^{k} \sum_{i=1}^{m} v_{i,f}^2 x_i^2$$

Similarly, document-related operations D may be defined as $$D_1 = w_0 + \sum_{i=m+1}^{n} w_i x_i$$

$$D_{2,f} = \sum_{i=m+1}^{n} v_{i,f} x_i$$

$$D_3 = \frac{1}{2} \sum_{f=1}^{k} \sum_{i=m+1}^{n} v_{i,f}^2 x_i^2$$

Thus, $$U_3 = \frac{1}{2} \sum_{f=1}^{k} \sum_{i=1}^{m} v_{i,f}^2 x_i^2$$

becomes $$\hat{y} := U_1 + D_1 + \frac{1}{2} \sum_{f=1}^{k} (U_{2,f} + D_{2,f})^2 - U_3 - D_3$$

A constant number Δ may be introduced to ensure that $$U_1 - U_3 + \Delta \geq 0$$

and $$D_1 - D_3 + \Delta \geq 0$$

Thus, $$\hat{y} := U_1 + D_1 + \frac{1}{2} \sum_{f=1}^{k} (U_{2,f} + D_{2,f})^2 - U_3 - D_3$$

becomes $$\hat{y} := \|\vec{u} - \vec{d}\|^2 2\Delta$$

where user-related feature vector $\vec{u}$ is defined as $$\vec{u} = \left[ \sqrt{U_1 - U_3 + \Delta}, 0, -\frac{\sqrt{2}}{2} U_{2,1}, \ldots, \frac{\sqrt{2}}{2} U_{2,k} \right],$$

and document-related vector $\vec{d}$ is defined as $$\vec{d} = \left[ 0, -\sqrt{D_1 - D_3 + \Delta}, -\frac{\sqrt{2}}{2} D_{2,1}, \ldots, \frac{\sqrt{2}}{2} D_{2,k} \right]$$

Feature vector $\vec{d}$ solely depends on documents, and thus can be pre-computed and stored in advance.

In another example embodiment, the fact that the feature vectors can be precomputed and stored in advance allows the system to leverage fast vector search libraries, such as a vector similarity search library (SCANN).

Furthermore, while the above describes having the linear global model/portion of a GLMix model swapped out for a deep learning model using a Factorization Machine with $L^2$ Norm reduction, in another example embodiment, the linear random models/portions of a GLMix model may be similarly swapped out for a deep learning model using a Factorization Machine with $L^2$ Norm reduction, either in conjunction with or in lieu of doing so with the linear global model/portion.

An example will be provided in the context of a social networking service scoring job postings for potential display to a user based on the relevance of the job postings to the user. It should be noted, however, that this is merely one example of how the improved GLMix model described herein can be utilized, and is not intended to be limiting.

Figure 1:
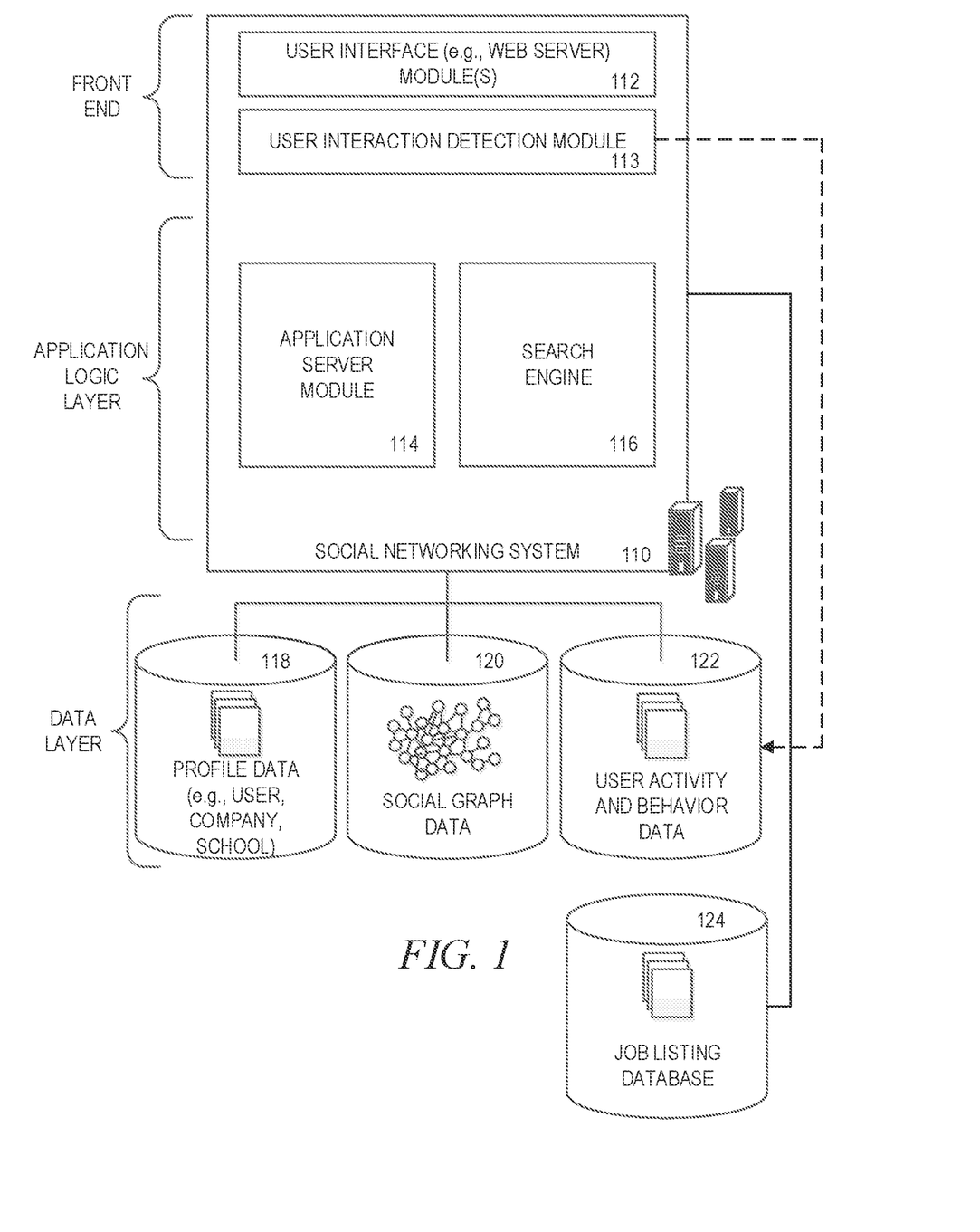
FIG. 1 is a block diagram showing the functional components of a social networking service, including a data processing module referred to herein as a search engine, for use in generating and providing search results for a search query, consistent with some embodiments of the present disclosure.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based Application Program Interface (API) requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by the search engine 116 to determine search results for a search query.

Although not shown, in some embodiments, the social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of job listings. These job listings may posted by job poster (entities that perform the posting, such as businesses) and stored in job listing database 124.

Figure 2:
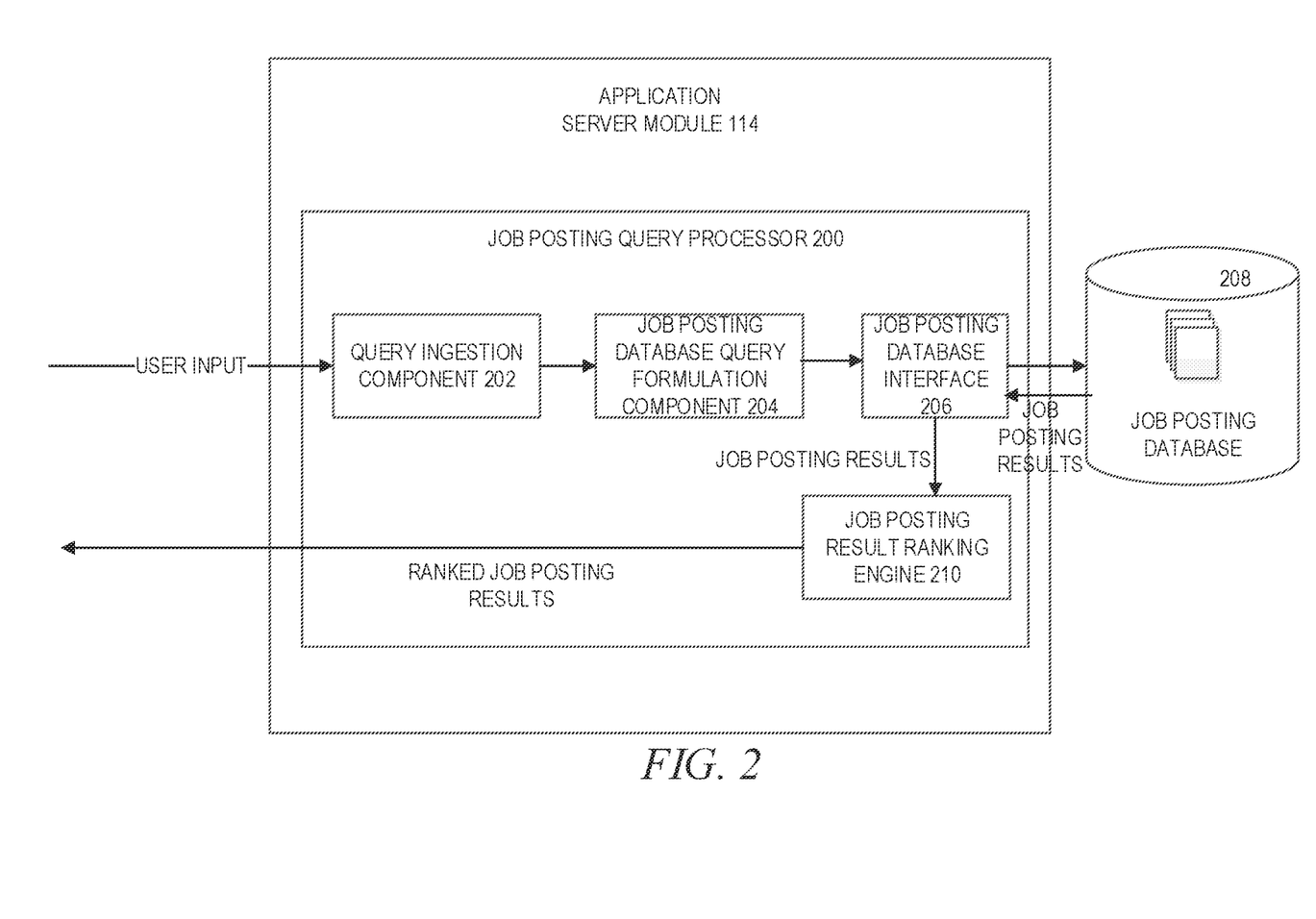
FIG. 2 is a block diagram illustrating application server module of FIG. 1 in more detail, in accordance with an example embodiment.

FIG. 2 is a block diagram illustrating application server module 114 of FIG. 1 in more detail, in accordance with an example embodiment. While in many embodiments the application server module 114 will contain many subcomponents used to perform various different actions within the social networking system 110, in FIG. 2 only those components that are relevant to the present disclosure are depicted.

A job posting query processor 200 comprises a query ingestion component 202, which receives a user input "query" related to a job posting search via a user interface (not pictured). Notably, this user input may take many forms. In some example embodiments, the user may explicitly describe a job posting search query, such as by entering one or more keywords or terms into one or more fields of a user interface screen. In other example embodiments, the job posting query may be inferred based on one or more user actions, such as selection of one or more filters, other job posting searches by the user, searches for other users or entities, and so forth.

This "query" may be sent to a job posting database query formulation component 204, which formulates an actual job posting database query, which will be sent via a job posting database interface 206 to job posting database 208. Job posting results responsive to this job posting database query may then be sent to the job posting result ranking engine 210, again via the job posting database interface 206. The job posting result ranking engine 210 then ranks the job posting results and sends the ranked job posting results back to the user interface for display to the user.

Figure 3:
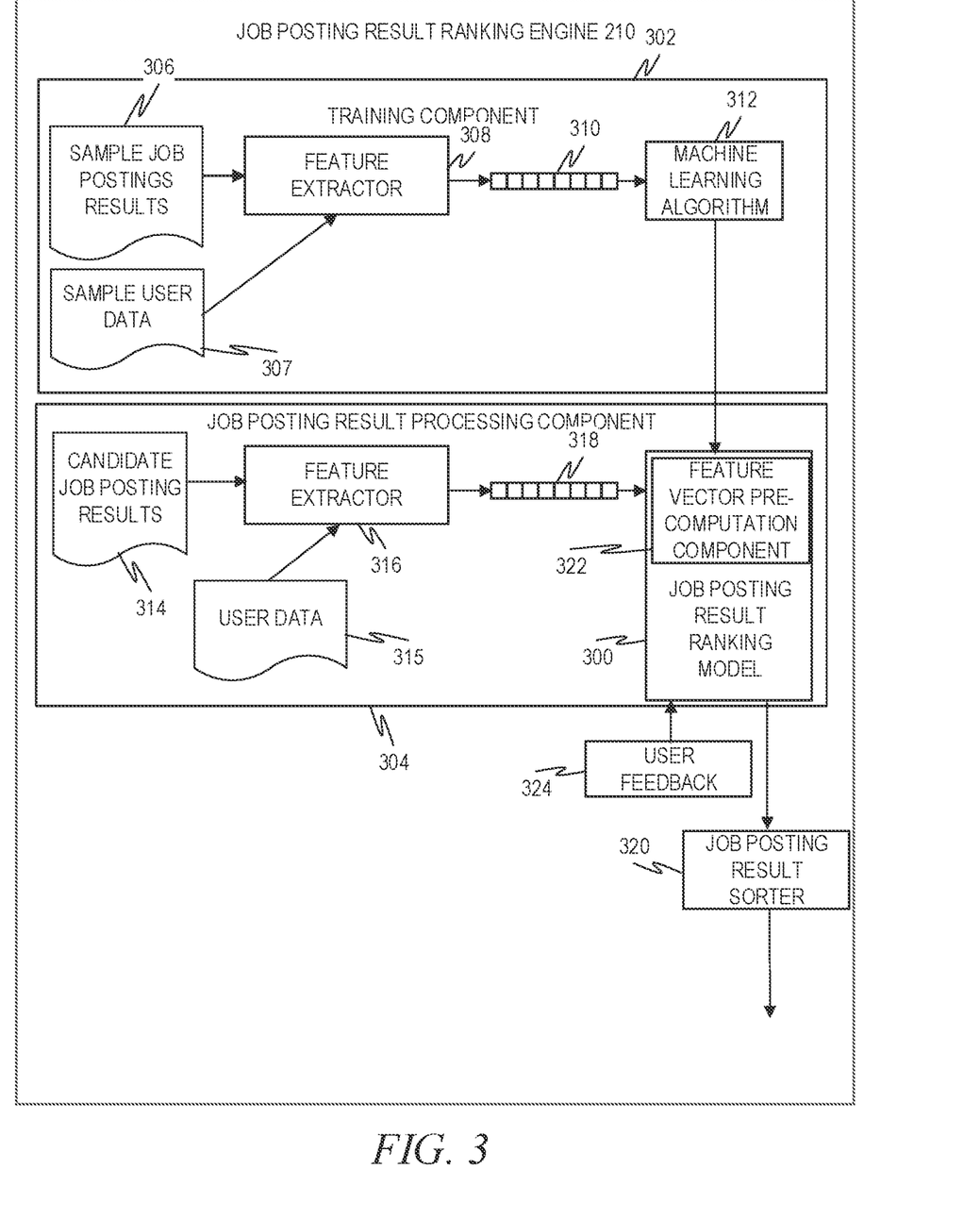
FIG. 3 is a block diagram illustrating the job posting result ranking engine of FIG. 2 in more detail, in accordance with an example embodiment.

FIG. 3 is a block diagram illustrating job posting result ranking engine 210 of FIG. 2 in more detail, in accordance with an example embodiment. The job posting result ranking engine 210 may use machine learning techniques to learn a job posting result ranking model 300, which can then be used to rank actual job posting results from the job posting database 208.

The job posting result ranking engine 210 may comprise a training component 302 and a job posting result processing component 304. The training component 302 feeds sample job postings results 306 and sample user data 307 into a feature extractor 308 that extracts one or more features 310 for the sample job postings results 306 and sample user data 307. The sample job postings results 306 may each include job postings results produced in response to a particular query as well as one or more labels, such as a job posting application likelihood score, which is a score indicating a probability that a user with a corresponding sample user data 307 will apply for the job associated with the corresponding sample job postings result 306.

Sample user data 307 may include, for example, a history of job searches and resulting expressions of interest (such as clicking on job posting results or applications to corresponding job listings), in particular job posting results for particular users. In some example embodiments, sample user data 307 can also include other data relevant for personalization of the query results to the particular user, such as a user profile for the user or a history of other user activity.

A machine learning algorithm 312 produces the job posting result ranking model 300 using the extracted features 310 along with the one or more labels. In the job posting result processing component 304, job postings results 314 resulting from a particular query are fed to a feature extractor 316 along with user data 315. The feature extractor 316 extracts one or more features 318 from the job postings results 314 and user data 315. These features 318 are then fed to the job posting result ranking model 300, which outputs a job posting application likelihood score for each job posting result for the particular query.

This job posting application likelihood score for each job posting result may then be passed to a job posting result sorter 320, which may sort the job postings results 314 based on their respective job posting application likelihood scores.

It should be noted that the job posting result ranking model 300 may be periodically updated via additional training and/or user feedback. The user feedback may be either feedback from users performing searches, or from companies corresponding to the job postings. The feedback may include an indication about how successful the job posting result ranking model 300 is in predicting user interest in the job posting results presented.

The machine learning algorithm 312 may be selected from among many different potential supervised or unsupervised machine learning algorithms 312. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistical regression model is used.

In an example embodiment, the machine learning algorithm 312 actually is two (or more) different machine learning algorithms for different portions of the job posting result ranking model 300. For example, a first machine learning algorithm may be used to train a global portion while a second machine learning algorithm may be used to train a random effects portion.

As described above, the training component 302 may operate in an offline manner to train the job posting result ranking model 300. The job posting result processing component 304, however, may be designed to operate in either an offline manner or an online manner.

Regardless, as described above, in an example embodiment, the global portion and/or random effect portion(s) may be trained using a Factorization machine with $L^2$ Norm Reduction. In an example embodiment, only the global portion is trained in this manner. This means that a feature vector pre-computation component 322 is able to pre-compute and store the feature vector portions of the Factorization machine model (run by the job posting result ranking model) from the features 318, resulting in significant computational savings over prior models, which would need to compute those feature vector portions at evaluation time (e.g. online).

Further, in an example embodiment, user feedback 324 may be used to retrain the job posting result ranking model 300, which causes the weights assigned to each feature to be re-learned.

Figure 4:
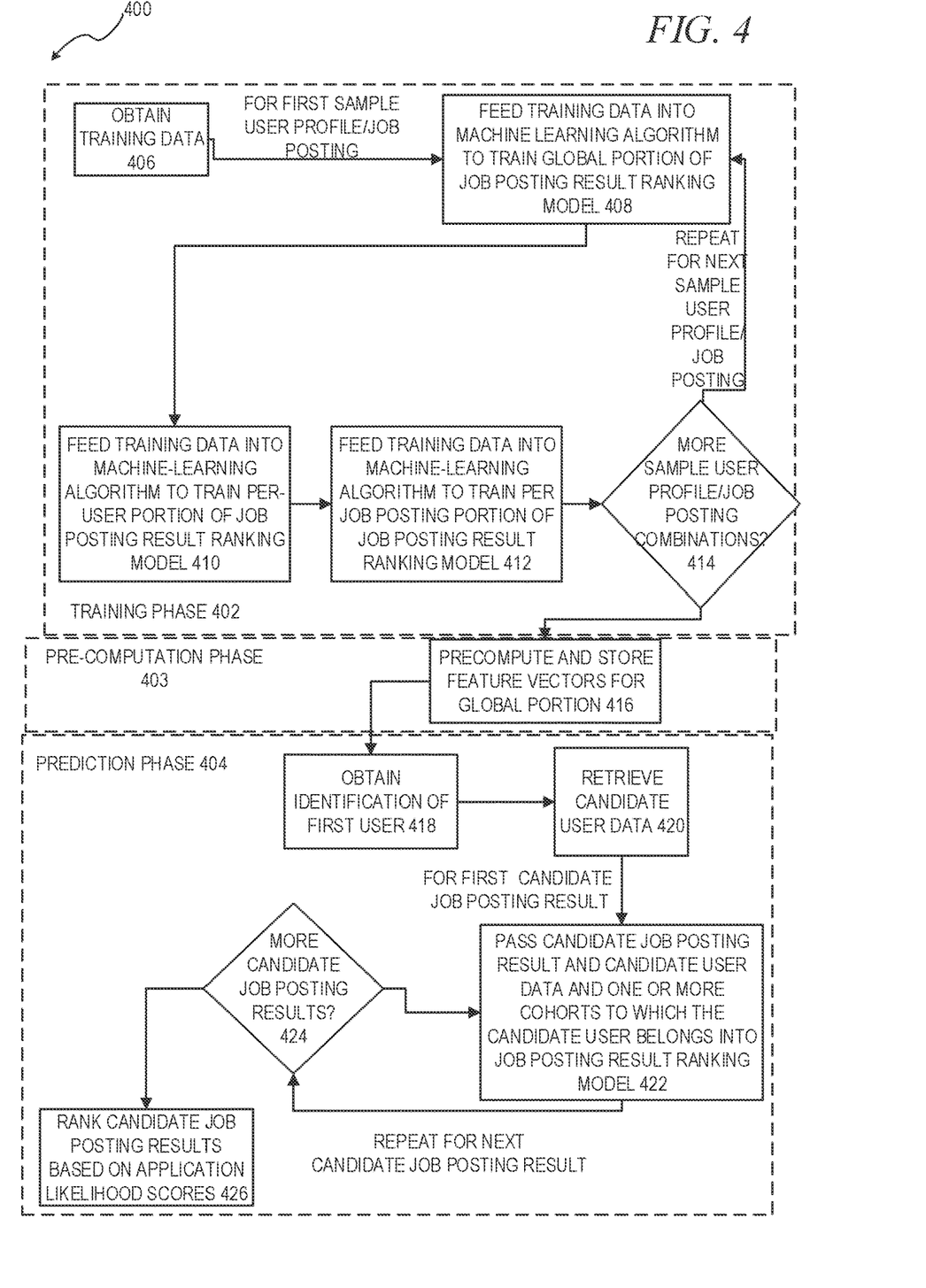
FIG. 4 is a flow diagram illustrating a method to sort job posting results in an online service, in accordance with an example embodiment.

FIG. 4 is a flow diagram illustrating a method 400 to sort job posting results in an online service, in accordance with an example embodiment. This method 400 may be divided into a training phase 402, a precomputation phase 403, and a prediction phase 404. In the training phase 402, at operation 406, training data pertaining to sample user profiles and corresponding job posting combinations are obtained. These combinations reflect actions taken by the users corresponding to the sample user profiles to the corresponding job postings. These actions may either be positive or negative, thus indicating positive or negative signals to the underlying machine learning algorithm that will utilize them. The signals may be explicit, including positive signals such as applying for a job corresponding to a job posting or saving a job posting, or negative signals such as dismissing a job (these actions all being taken in a corresponding graphical user interface by, for example, selecting explicit buttons corresponding to these actions), or implicit, including positive signals such as viewing a job posting for a particular period of time or negative signals such as skipping over a job posting.

Then a loop is begun for each of the sample user profile/job posting combinations. At operation 408, the corresponding training data is fed into a factorization machine with $L^2$ norm reduction to train a global portion of a job posting result ranking model to output a job posting application likelihood score for a job posting result and user data. At operation 410, a subset of the training data is fed into another (e.g., linear) machine-learning algorithm to train a per-user portion of the job posting result ranking model. This subset of the training data is limited to the training data corresponding to a particular user. More generically, this may be thought of as being limited to a particular value (here the particular user id) of one of the features of the training data (here the user id feature).

Then, at operation 412, a second subset of the training data is fed into another machine learning algorithm to train a per-job-posting portion of the job posting result ranking model. This second subset of the training data is limited to the training data corresponding to a particular job posting. More generically, this may be thought of as being limited to a particular value (here the job posting id) of another of the features of the training data (here the job posting id feature).

At operation 414, it is determined if there are any more sample user profile/job posting combinations. If so, the method 400 may loop back to operation 408 for the next sample user profile/job posting combination. If not, then the method 400 may move to the precomputation phase 403.

At the precomputation phase 403, at operation 416, feature vectors for the global portion of the job posting result ranking model are precomputed and stored for one or more job postings and/or users. This assumes that the embodiment being used is the one where only the global model uses L-2 norm reduction (and is therefore precomputed). How many of the feature vectors for the job postings and/or users are precomputed and stored may vary based on implementation. In one example embodiment, all available job postings and/or users have their feature vectors precomputed and stored, but in other example embodiments, it may be less than all based on some sort of selection criteria (e.g., only job postings or users that are likely to be scored, according to some criteria).

Turning to the prediction phase 404, at operation 418, an identification of a first user of the social networking service is obtained. At operation 420, user data for the first user is retrieved using the identification. Then a loop is begun for each of a plurality of different job posting results retrieved in response to a query from the first user. At operation 422, the job posting result and the user data for the first user, as well as one or more cohorts to which the user belongs, are passed to the job posting result ranking model to generate a job posting application likelihood score for the job posting result and the first user. This involves passing the job posting result and user data to the global and random effect portion(s) of the model, outputting a score for each portion. These scores are then combined into a single job posting application likelihood score. Notably, since the feature vectors for the global portion of the job posting result ranking model were precomputed in operation 416, these precomputed feature vectors can be used by the global portion at this stage, rather than requiring computation of these vectors at this point. At operation 424, it is determined if there are any more job posting results. If so, then the method 400 may loop back to operation 420 for the next job posting result. If not, then at operation 426, the plurality of different job posting results are ranked based on the application likelihood scores.

Figure 5:
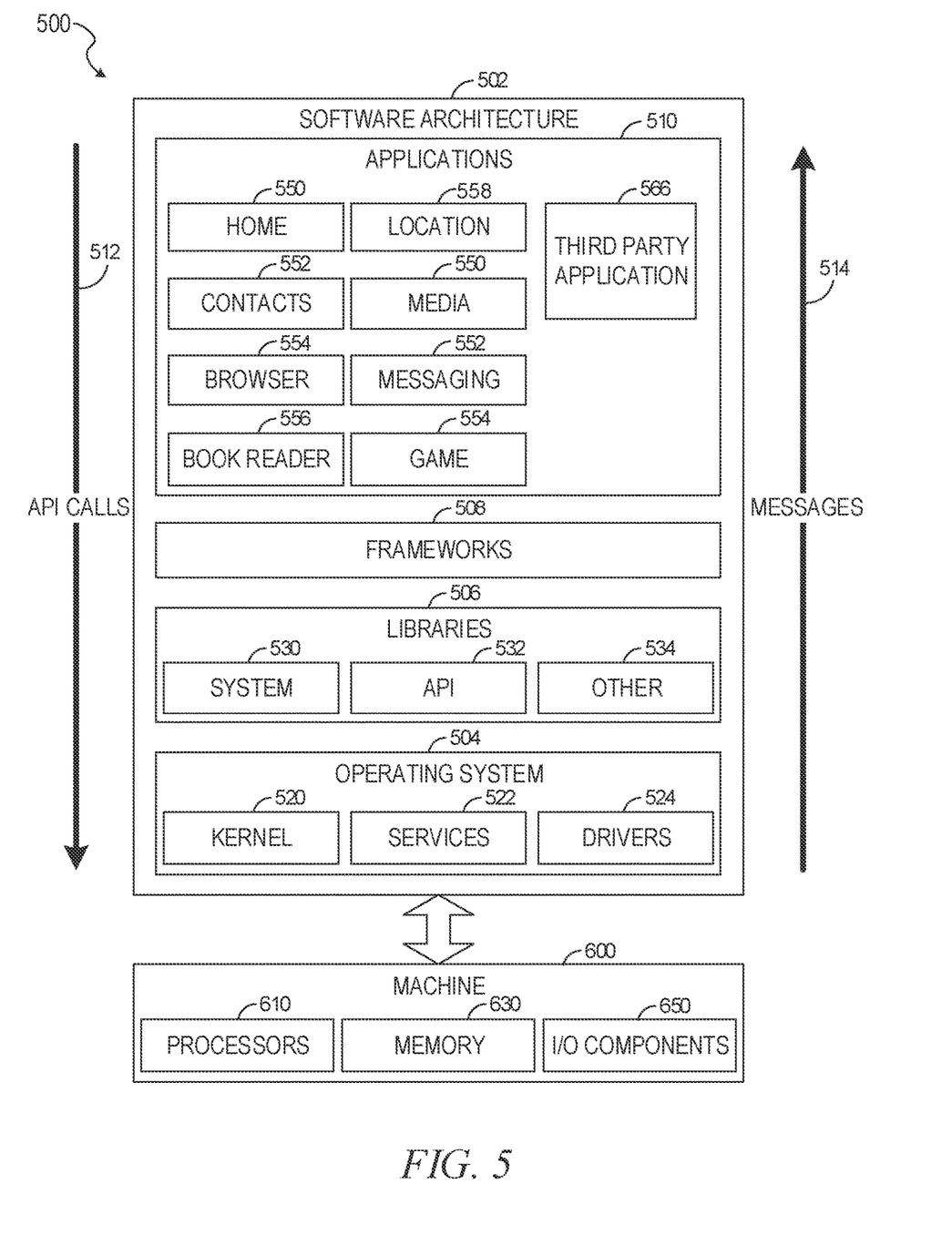
FIG. 5 is a block diagram illustrating a representative software architecture, which may be used in conjunction with various hardware architectures herein described.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
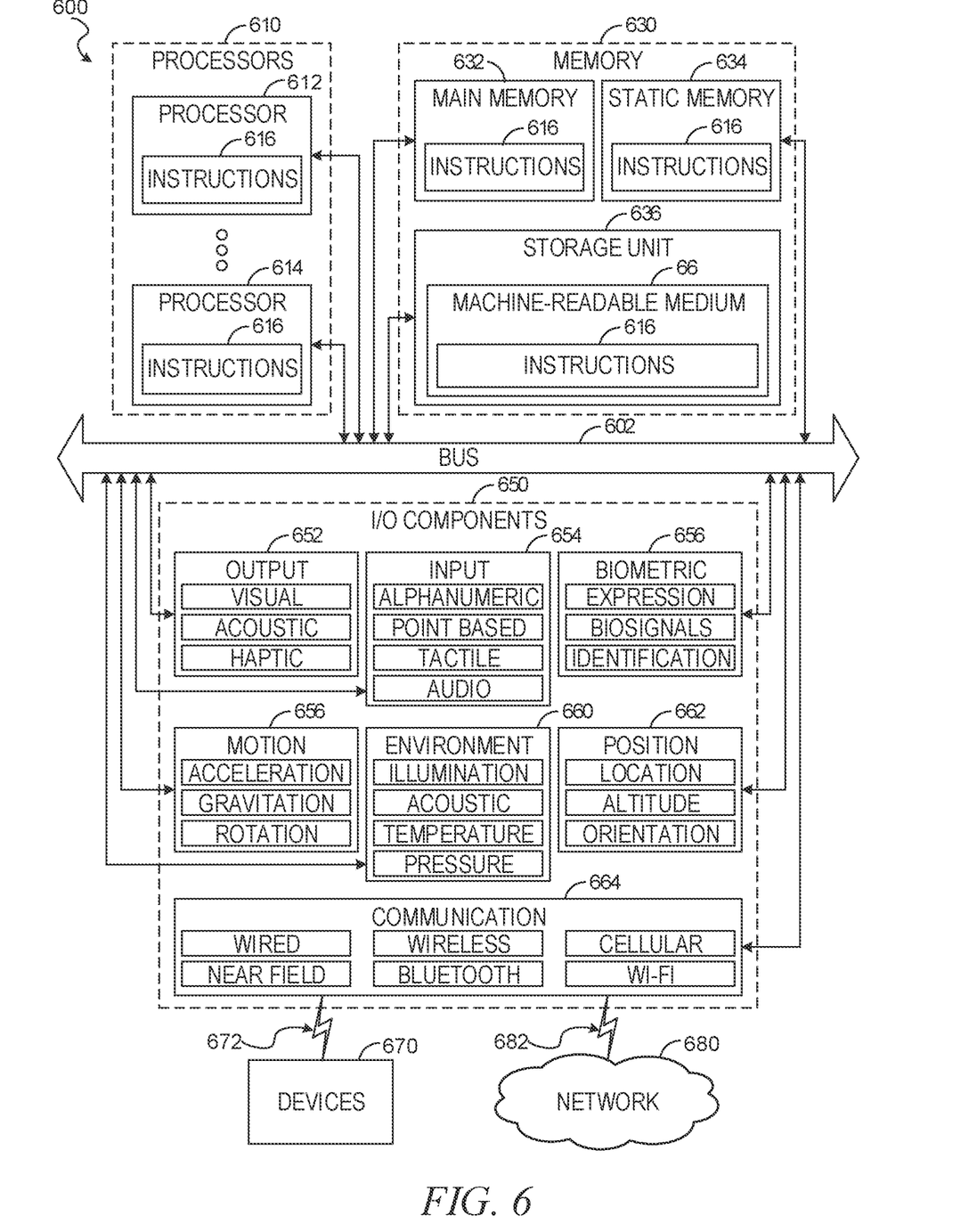
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 illustrates a diagrammatic representation of a machine 600 in the form of a computer system within which a set of instructions may be executed for causing the machine to perform any one or more of the methodologies discussed herein, according to an example embodiment. Specifically, FIG. 6 shows a diagrammatic representation of the machine 600, in the example form of a computer system, within which instructions 616 (e.g., software, a program, an application 510, an applet, an app, or other executable code) for causing the machine 600 to perform any one or more of the methodologies discussed herein may be executed. For example, the instructions 616 may cause the machine 600 to execute the method 400 of FIG. 4. Additionally, or alternatively, the instructions 616 may implement FIGS. 1-4, and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 657, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 657 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to the processors 610. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a computer-readable medium having instructions stored thereon, which, when executed by a processor, cause the system to:
obtain training data, the training data comprising values for a plurality of different features;
train a global machine learned model using a first machine learning algorithm by feeding the training data into the first machine learning algorithm during a fixed effect training process, the first machine learning algorithm being a deep learning machine learning algorithm that utilizes a factorization machine with L2 norm reduction to divide calculations made by the factorization machine into a portion that can be precomputed and a portion that cannot be precomputed;
train a first random effects machine learned model by feeding a subset of the training data into a second machine learning algorithm, the subset of the training data being limited to training data corresponding to a particular value of one of the plurality of different features;
feed a first feature vector for a first document into the global machine learned model, producing a first score, the first document comprising a job posting from an online service;
feed a second feature vector for the first document into the first random effects machine learned model, producing a second score;
combine the first score and the second score into a ranking score, the ranking score used to rank the first document against other documents, the other documents comprising job postings from the online service; and
based on the ranking score, serving, to a graphical user interface (GUI) on a user device, the first document.

2. The system of claim 1, wherein the system is further caused to:
perform one or more iterations of the training of the global machine learned model and the training of the first random effects machine learned mode each iteration varying weights applied to the plurality of features.

3. The system of claim 1, wherein each iteration further comprises:
training a second random effects machine learned model by feeding a second subset of the training data into a third machine learning algorithm, the second subset of the training data being limited to training data corresponding to a particular value of another of the plurality of different features.

4. The system of claim 1, wherein the system is further caused to, prior to the feeding of the first document into the global machine learned model, for each of one or more documents, including the first document, precompute a feature vector for the document.

5. The system of claim 4, wherein the first feature vector for the first document is the precomputed feature vector for the first document.

6. The system of claim 5, wherein the second feature vector for the first document is not precomputed.

7. The system of claim 4, wherein the second feature vector is computed after the first document has been matched with a first user in response to a query.

8. A method comprising:
obtaining training data, the training data comprising values for a plurality of different features;
training a global machine learned model using a first machine learning algorithm by feeding the training data into the first machine learning algorithm during a fixed effect training process, the first machine learning algorithm being a deep learning machine learning algorithm that utilizes a factorization machine with L2 norm reduction to divide calculations made by the factorization machine into a portion that can be precomputed and a portion that cannot be precomputed;
training a first random effects machine learned model by feeding a subset of the training data into a second machine learning algorithm, the subset of the training data being limited to training data corresponding to a particular value of one of the plurality of different features;
feeding a first feature vector for a first document into the global machine learned model, producing a first score, the first document comprising a job posting from an online service;

feeding a second feature vector for the first document into the first random effects machine learned model, producing a second score;

combining the first score and the second score into a ranking score, the ranking score used to rank the first document against other documents, the other documents comprising job postings from the online service; and based on the ranking score, serving, to a graphical user interface (GUI) on a user device, the first document.

9. The method of claim 8, further comprising:

performing one or more iterations of a machine learned model training process, each iteration varying weights applied to the plurality of features, each iteration comprising the training of the global machine learned model and the training of the first random effects machine learned model.

10. The method of claim 9, wherein each iteration further comprises:

training a second random effects machine learned model by feeding a second subset of the training data into a third machine learning algorithm, the second subset of the training data being limited to training data corresponding to a particular value of another of the plurality of different features.

11. The method of claim 8, further comprising, prior to the feeding of the data into the global machine learned model, for each of one or more documents, including the first document, precomputing a feature vector for the document.

12. The method of claim 11, wherein the first feature vector for the first document is the precomputed feature vector for the first document.

13. The method of claim 12, wherein the second feature vector for the first document is not precomputed.

14. The method of claim 11, wherein the second feature vector is computed after the first document has been matched with a first user in response to a query.

15. A system comprising:

means for obtaining training data, the training data comprising values for a plurality of different features;

means for training a global machine learned model using a first machine learning algorithm by feeding the training data into the first machine learning algorithm during a fixed effect training process, the first machine learning algorithm being a deep learning machine learning algorithm that utilizes a factorization machine with L2 norm reduction to divide calculations made by the factorization machine into a portion that can be precomputed and a portion that cannot be precomputed;

means for training a first random effects machine learned model by feeding a subset of the training data into a second machine learning algorithm, the subset of the training data being limited to training data corresponding to a particular value of one of the plurality of different features;

means for feeding a first feature vector for a first document into the global machine learned model, producing a first score, the first document comprising a job posting from an online service;

means for feeding a second feature vector for the first document into the first random effects machine learned model, producing a second score;

means for combining the first score and the second score into a ranking score, the ranking score used to rank the first document against other documents, the other documents comprising job postings from the online service; and based on the ranking score, means for serving, to a graphical user interface (GUI) on a user device, the first document.

16. The system of claim 15, further comprising:

means for performing one or more iterations of a machine learned model training process, each iteration varying weights applied to the plurality of features, each iteration comprising the training of the global machine learned model and the training of the first random effects machine learned model.

* * * * *